United States Patent
LaFreniere et al.

(10) Patent No.: US 8,335,303 B2
(45) Date of Patent: Dec. 18, 2012

(54) SYSTEM AND METHOD FOR TELEPHONE CALL CONTROL

(75) Inventors: Gary W. LaFreniere, Olathe, KS (US); Michael S. Goergen, Medford, OR (US); David E. Emerson, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 512 days.

(21) Appl. No.: 12/616,362

(22) Filed: Nov. 11, 2009

(65) Prior Publication Data

US 2011/0110508 A1    May 12, 2011

(51) Int. Cl.
- H04M 1/56 (2006.01)
- H04M 3/00 (2006.01)
- H04W 40/00 (2009.01)

(52) U.S. Cl. ............... 379/142.07; 379/266.02; 455/428

(58) Field of Classification Search ............... 379/93.17, 379/93.05, 159, 167.01
See application file for complete search history.

(56) References Cited

U.S. PATENT DOCUMENTS

| | | | | |
|---|---|---|---|---|
| 7,013,000 | B2* | 3/2006 | Bortolini et al. | 379/93.05 |
| 2003/0231749 | A1* | 12/2003 | Ansley et al. | 379/93.17 |
| 2006/0251229 | A1* | 11/2006 | Gorti et al. | 379/142.02 |
| 2007/0127644 | A1* | 6/2007 | Tischer et al. | 379/93.02 |
| 2007/0203979 | A1* | 8/2007 | Walker et al. | 709/204 |
| 2008/0043970 | A1* | 2/2008 | Scholes et al. | 379/212.01 |
| 2009/0141708 | A1* | 6/2009 | Rodriguez et al. | 370/352 |
| 2010/0215154 | A1* | 8/2010 | Bell | 379/49 |

OTHER PUBLICATIONS

Advanced Call Manager, http://melonmobile.com/ProductDetailsOverview.aspx?product=203, p. 1, printed Jan. 14, 2010.
Caller ID, Wlkipedia, http://en.wikipedia.org/wiki/Caller_id, pp. 1-5, printed Jan. 14, 2010.
How do I perform a Global Address List (GAL) look up from a Windows Mobile 5.0 phone?, Windows IT Pro, http://windowsitpro.com/article/articleid/50627/how-do-i-perform-a-global . . . , pp. 12, printed Jan. 14, 2010.
IPTV, Wikipedia, http://en.wikipedia.org/wiki/IPTV, pp. 1-6, printed Jan. 14, 2010.

* cited by examiner

*Primary Examiner* — Fan Tsang
*Assistant Examiner* — Solomon Bezuayehu
(74) *Attorney, Agent, or Firm* — Swanson & Bratschun, L.L.C.

(57) ABSTRACT

A system for controlling incoming and/or outgoing calls on a telephone system having a single incoming/outgoing telephone line to which multiple telephone ports are connected. The system includes a database of instructions for processing calls, with the instructions being determined by the line owner. The system also includes a central processing unit for applying one or more of the user-specified instructions to selectively process an incoming or outgoing telephone call. The system may additionally include a caller identification device for identifying incoming caller numbers, and may process incoming calls according to the identity of the caller. The system may also include instructions for processing calls according to the time of day, or other user-specified parameters. Another aspect of the invention provides a method for controlling incoming and/or outgoing telephone calls, using the system and instructions described above.

23 Claims, 4 Drawing Sheets

SYSTEM AND METHOD FOR TELEPHONE CALL CONTROL

FIELD OF THE INVENTION

Embodiments of the present invention relates generally to a system and method for controlling telephone calls, and more particularly to a system and method for controlling incoming and outgoing telephone calls in a home or office.

BACKGROUND OF THE INVENTION

Home telephone service is advantageously delivered through a single "line" (i.e., a single telephone number) that may be connected to a multiplicity of ports so that multiple phone units may be used, simultaneously or individually, on the line. The individual phone units are commonly distributed throughout the home, and may be located, for example, in bedrooms, kitchens, family rooms, home offices, etc. Similar systems may also be used in non-home situations, such as small offices, apartments, condominiums, clubs, etc.

When a call is received by the "home" phone line, the call is typically transmitted to each of the telephone ports that share the common telephone number, with the call generally being transmitted by a wired or wireless network to the various telephone ports. With existing technology, however, the calls are routed non-selectively to the existing telephone ports, and the home or office owner does not have the ability to control the details of how the call is routed through the home or office network. This may cause problems when, for example, a call coming into the home late at night must be sent to all telephone ports regardless of the location of the port.

Similarly, when calls are originated by a telephone of a multi-port home or office telephone network, the home or office owner is not presently able to control the details of which ports may place a call. This allows all ports that share the common number to be able to, for example, place a long distance call regardless of whether that call is allowed or authorized by the home owner.

A solid medium land line such as a metal wire or a fiber optic cable is commonly used to ensure security and a high quality of service for home telephone service. Common calling methods using such solid medium land lines include public switched telephone network (PSTN), and voice over internet protocol (VOIP) services.

When a call is transmitted over a solid medium land line, it is known to utilize certain communication technologies to improve the telephone experience. For example, caller ID (also known also as caller identification, or, more properly, "calling number identification") is a commonly-available telephone service that transmits a caller's number to the called party's telephone equipment during the ringing signal to allow the call recipient to know the number that the call is coming from. With some systems, caller ID also provides a name associated with the calling telephone number to further identify the caller. The number and/or name is typically displayed on the receiving party's telephone, although in some cases it may be displayed on a separate device.

Global address books (also known as global address lists) are a commonly-available directory service for e-mail systems that contains information for all e-mail users, distribution groups, and exchange resources. Each address list can contain one or more types of objects (for example, users, contacts, groups, public folders, conferencing, and other resources), and is typically used to organize recipients and resources, making it easier to find the desired recipients and resources.

As previously indicated though, in spite of the availability of caller ID and global address books, systems to allow a user to more selectively and efficiently manage incoming and outgoing calls on single-line telephone networks are not presently available. The present invention addresses that need.

SUMMARY OF THE INVENTION

In one aspect of the present invention there is provided a system for controlling incoming and/or outgoing telephone calls for a home or office. The system preferably comprises a telephone system, which may be a home telephone system, having a single telephone line to which a multiplicity of telephone ports are connected. The system also preferably comprises a database of instructions for processing a call received by or originating on the telephone line, with the instructions being determined by one or more user-specified parameters. The system also preferably comprises a central processing unit for applying one or more of the user-specified instructions to selectively process an incoming or outgoing telephone call. The instructions often particularly include instructions for routing an incoming call to one or more of the telephone ports.

The system may additionally include a caller identification device for identifying a caller number associated with a call placed to the telephone number. When a caller identification device is included, the database of instructions may include instructions for processing an incoming telephone call according to the identity of the caller number. For example, the instructions may include instructions for accepting or not accepting a call according to the identity of the caller number, and/or for routing the call to one or more particular phone ports. Similarly, the instructions may include instructions for applying a selected ring tone according to the identity of the caller number.

In some embodiments the instructions may include instructions for processing an incoming call according to the time of day. If so, the instructions may include instructions for routing the call to a selected subset of the telephone ports depending on the time of day that the call is received.

In other embodiments the system may include instructions for processing outgoing calls. For example, the instructions may include instructions for allowing or disallowing outgoing calls to be made from certain phone ports, or for allowing or disallowing long-distance or other toll calls to be originated from certain ports.

In another aspect of the present invention there is provided a method for controlling incoming and/or outgoing telephone calls. The method preferably comprises providing a call control system as identified above, and using the system to control calls. The inventive method may control calls as outlined above, or in other ways as herein described.

DETAILED DESCRIPTION OF THE PREFERRED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

As previously indicated, one embodiment of the present invention provides a system for controlling incoming and/or outgoing calls. The system includes a call control device that is effective for accomplishing one or more of the following: 1) identifying incoming calls by the incoming call telephone number; 2) determining whether an incoming call has been placed from a number for which processing instructions have been provided by the call control device user; 3) processing an incoming call according to user-specified instructions if the call has been placed from a number for which processing instructions have been provided to the call control device by the device user; 4) selectively routing incoming calls to one or more selected phone ports according to instructions that have been provided to the call control device by the device user; 5) determining whether an outgoing call has been placed from a port for which processing instructions have been provided by the call control device user; 6) processing an outgoing call according to user-specified instructions if the call has been placed from a port for which processing instructions have been provided to the call control device by the device user; and 7) allowing the device user to provide and/or modify the call control instructions by accessing the central processing unit, either remotely or on the premises.

The system is preferably used for controlling incoming and/or outgoing telephone calls in any facility having multiple telephone ports that serve a single telephone line, such as in a home, apartment, condominium, or office. For the purposes of this description, the term "controlling" includes selectively or non-selectively performing one or more of the following: processing, routing, handling, allowing, disallowing, affecting, distinguishing, manipulating, applying instructions to, etc., a telephone call.

Figure 1:
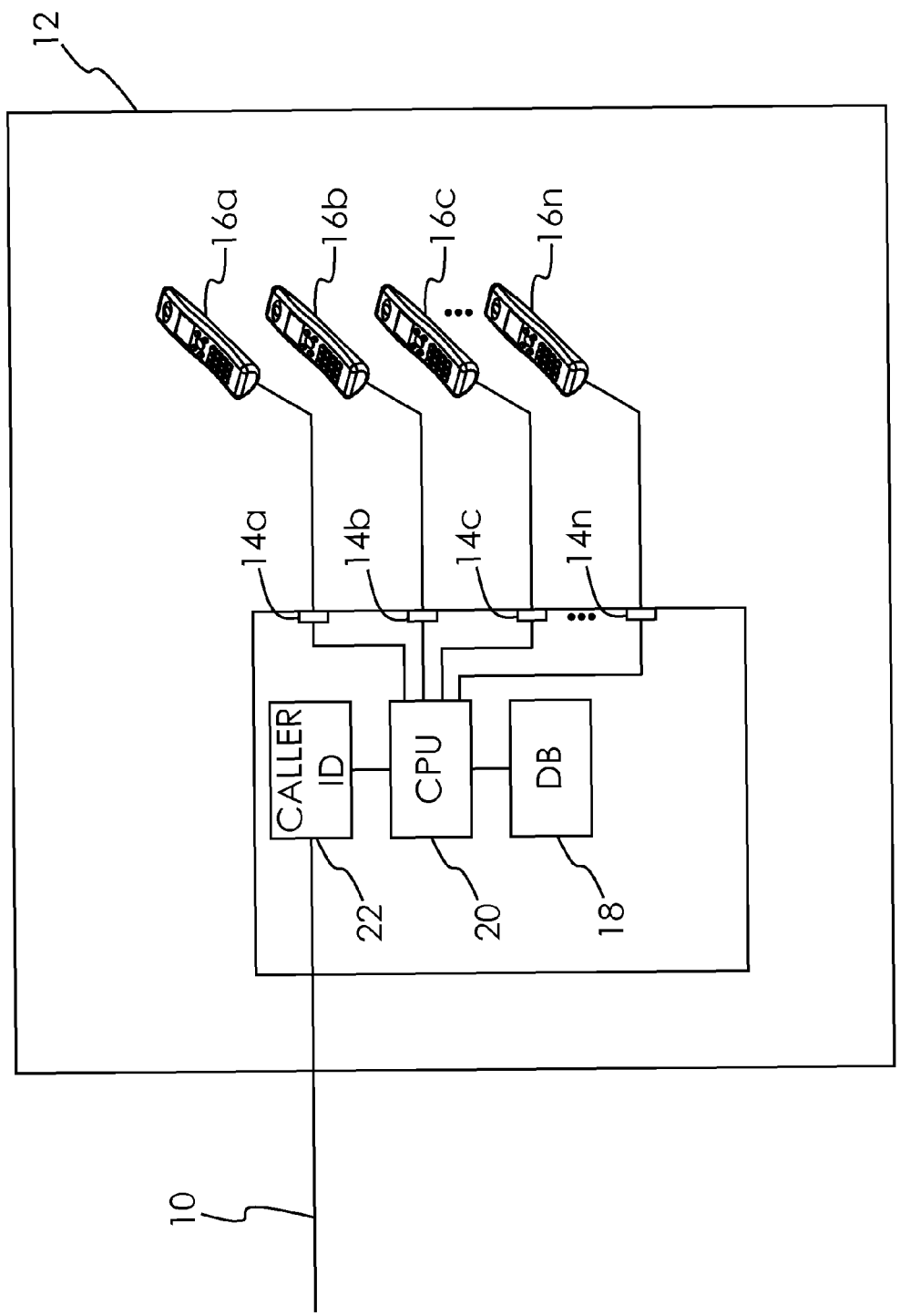
FIG. 1 illustrates an exemplary system for controlling incoming and/or outgoing calls to and/or from a home or office, according to one embodiment of the present invention.

Referring now to FIG. 1, the system preferably comprises a home telephone network having a single telephone line 10 entering the home 12, to which a multiplicity of telephone ports 14a, 14b, 14c, . . . 14n are connected. While the network is referred to herein as being a "home" 12 telephone network, it is to be understood that the "home" need not be a single- or multi-family residence, and may be an office, a club, or any other location where a single telephone number is used to serve a multiplicity of phone ports. Moreover, the "home" may be an apartment, a condominium, or any other type of dwelling if indeed it is a residence at all.

The home telephone network ports 14a, 14b, 14c, . . . 14n simultaneously connect a multiplicity of telephone units 16a, 16b, 16c, . . . 16n to the single telephone line 10. The multiplicity of telephone ports 14 may be connected by a wired or wireless network.

The system also preferably comprises a database 18 of instructions for processing a call received by the telephone line, with the instructions being determined by one or more user-specified parameters. The database 18 of instructions may include instructions for determining how an incoming or an outgoing call should be routed, whether a particular telephone port 14 should receive a call during certain hours, whether a particular telephone port 14 should receive a call from a certain telephone number, etc. The instructions are typically stored and formatted in a way so as to be readable and actionable by a central processing unit.

The system also preferably comprises a central processing unit (CPU) 20 operably connected to the database 18 of instructions and to the telephone system in a manner effective for allowing the CPU 20 to receive and apply one or more of the instructions. The CPU 20 is preferably a microprocessor adapted to fetch, decode, execute, and writeback a sequence of instructions stored in the database 18.

The system may additionally include a caller identification device 22 for identifying a caller number associated with a telephone call placed to the call control system user's telephone line 10. The caller identification system 22 may identify one or both of two separate pieces of information: the calling number and the billing/subscriber name. In some embodiments, the CPU 20 may be used for the caller identification device 22.

When a caller identification device 22 is included, the database 18 of instructions may include instructions for processing an incoming telephone call according to the identity of the caller number. When instructions for processing an incoming telephone call according to the identity of the caller number are provided, the instructions may include instructions for accepting or not accepting a call according to the identity of the caller number, and/or instructions for routing the call to one or more of the telephone ports. Similarly, the instructions for processing an incoming telephone call according to the identity of the caller number may include instructions for applying a selected ring tone to the call according to the identity of the caller number.

In some embodiments the instructions may include instructions for processing an incoming call according to the time of day. If so, the instructions may include instructions for routing the call to one or more of the telephone ports depending on the time of day that the call is received. For example, the instructions may provide that calls are not received in a bedroom after a certain time, or that only calls from a certain list of numbers are received in a bedroom after a certain time.

In some embodiments the instructions may include instructions for processing outgoing calls. In such embodiments the instructions may include instructions for disallowing a specific phone port to place any calls, or for disallowing specific phones to place calls that incur a call-specific charge (i.e., a toll call), or for disallowing specific phones to place calls to one or more user-specified numbers.

In another aspect of the present invention there is provided a method for controlling incoming and/or outgoing telephone calls. The method preferably comprises providing a call control system as identified above, and using the system to control calls. Toward that end, the call control system used in the inventive method may include a home telephone system, as described above, having a single ingoing/outgoing line 10 connected to a multiplicity of telephone ports 14. The system may additionally include a database 18 of instructions for processing a call to or from said telephone line 10 according to one or more user-specified parameters, and a central processing unit 20 for applying one or more of said instructions to selectively process a call. The method includes using the call control system to receive or originate a call, selecting one or more instructions from the database 18 of instructions, and processing the call according to the selected instructions.

As with the inventive system, the database 18 of instructions used in the inventive method may include instructions for routing a call to one or more of said telephone ports 14, and if so, the method may include using the database 18 of instructions to route a call to one or more of said telephone ports 14. The set of ports 14 to which a call may be routed may include a single port, a selected subset of the ports, or all of the ports, according to the instructions provided by the user.

The inventive method may also provide a call control system having a caller identification device 22 for identifying a caller number associated with a telephone call placed to said telephone line 10, and if so, the method may include using the caller identification device 22 to identify a caller number associated with a telephone call placed to said telephone line 10, and processing the incoming telephone call according to the identity of the caller number. When the method includes applying instructions for processing an incoming telephone call according to the identity of the caller number, the applied instructions may include instructions to accept or not accept a call according to the identity of the caller number, or to route the call to a particular phone port 14 or a set of phone ports 14. Similarly, when the method includes applying instructions for processing an incoming telephone call according to the identity of the caller number, the method may include applying a selected ring tone to the call.

The database 18 of instructions may include instructions for processing an incoming call according to the time of day, and if so, the method may include using those instructions to process an incoming call according to the time of day. For example, the method may include routing a call to certain phone ports 14 after a certain selected time, or responding to the call with a pre-recorded message according to the time at which the call is received.

The inventive method may also provide a call control system that includes instructions for processing outgoing calls. In such embodiments the system may include instructions for allowing or disallowing a specific phone port 14 to place a call (i.e. the ability to render a specific phone port 14 inoperative), and the method may include the step of allowing or disallowing a specific phone port 14 to place a call. Similarly, the method may include applying instructions for allowing or disallowing one or more selected phones 16 to place calls that incur a call-specific charge (i.e., a toll call), and/or for allowing one or more selected phones 16 to place calls to one or more specified numbers.

In some embodiments the user may enter instructions and/or make changes to the instructions using a computer interface. Accordingly, it is not necessary to enter instructions by dialing controls on individual handsets, which can be tedious when long or detailed instructions are desired.

In some embodiments the system of the present invention may be accessed remotely. This allows the user to make changes to the system instructions remotely, thereby facilitating ease of use. The remote access may be performed by calling the system from a remote location, or by accessing the system online via internet services and an application programming interface (API).

The system hardware may be a gateway for any of a set of different types of calling methods, including PSTN, VOIP, etc. The system may also be adapted to accommodate wireless technology, such as Bluetooth pairing technology.

The system may include a device for recording messages for, and sending messages to, the originator of an incoming call. Accordingly, the system may be adapted to send a message to an incoming caller that the call has been received and is being processed, or any other message that is desired.

Incoming calls may be managed by the hardware CPU 20 and passed through process logic. The process logic may be used to determine which rules should be applied and how the incoming or outgoing call should be handled.

The inventive system may utilize a global address book via custom or open API access. In some embodiments, the global address book may be integrated into the database 18. The global address book may be used to facilitate determining and/or applying the user-specified instructions. For example, the global address book may contain a black/white caller list to facilitate identifying callers from whom calls may or may not be received.

In some embodiments the CPU 20 may be programmed to "learn" instructions/rules according to the history of how previous calls were handled. For example, if the system identifies that all previous calls to a certain number were placed from a specific phone port 14, the system may write and implement a rule providing that incoming calls from that number are routed to that port 14.

Figure 2:
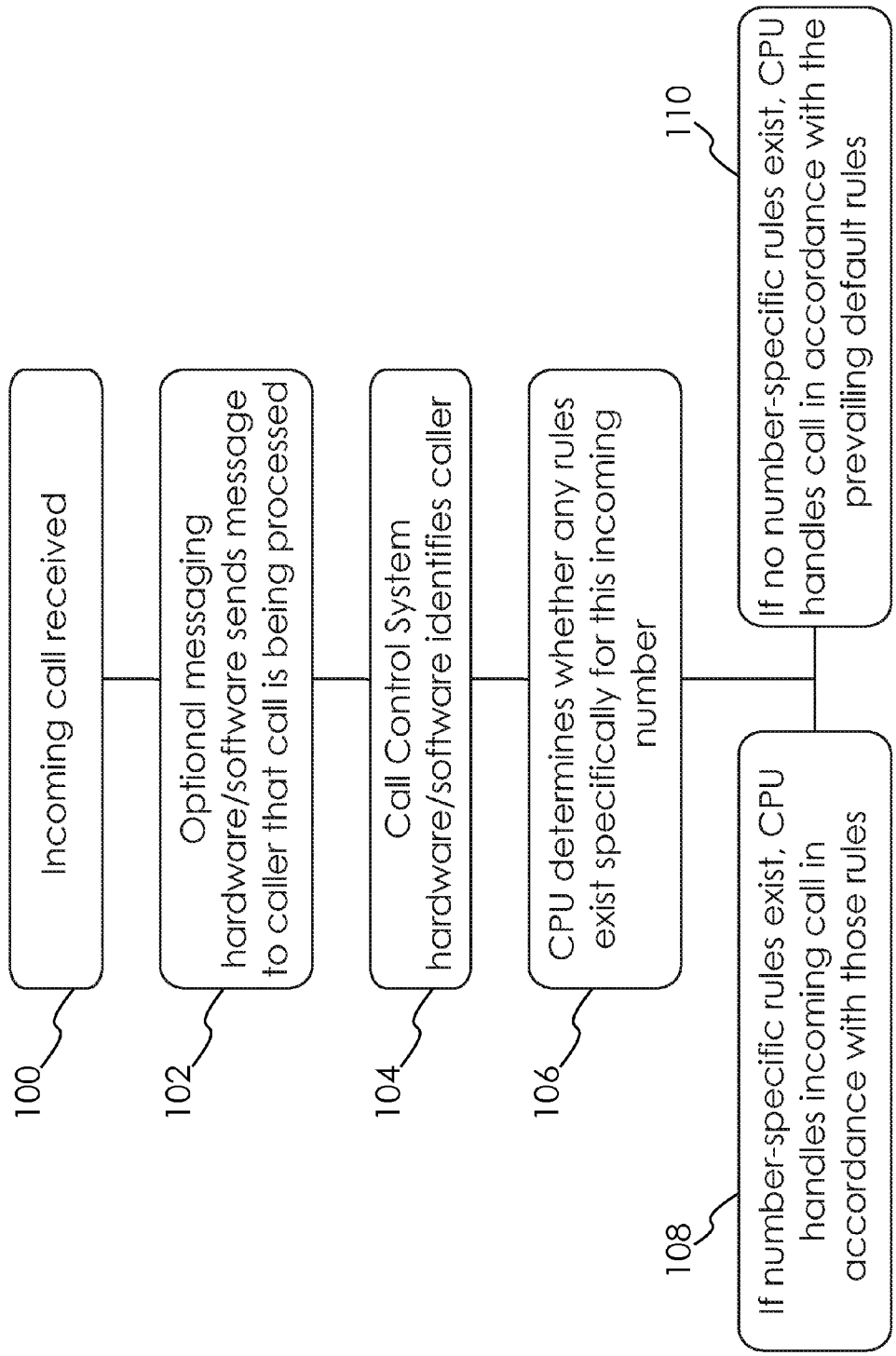
FIG. 2 illustrates an exemplary method for controlling incoming calls for a home or office, according to one embodiment of the present invention.

Referring now to the drawings, FIG. 2 shows a process for receiving an incoming call, according to one preferred embodiment. The incoming call is received at step 100, and an optional messaging hardware/software informs the caller at step 102 that the call is being processed. The call control system hardware/software indentifies the caller at step 104, and determines at step 106 whether any rules exist for that specific caller number. If so, the call control system applies the rules at step 108 and routes or otherwise handles the call accordingly. If there are no rules for the specific caller number, the call is processed at step 110 according to a user-determined set of "default" rules. For example, if no rules exist for the specific caller number, the call may be routed to all telephone ports 14 or sent to voicemail, to give just two non-limiting examples.

Figure 3:
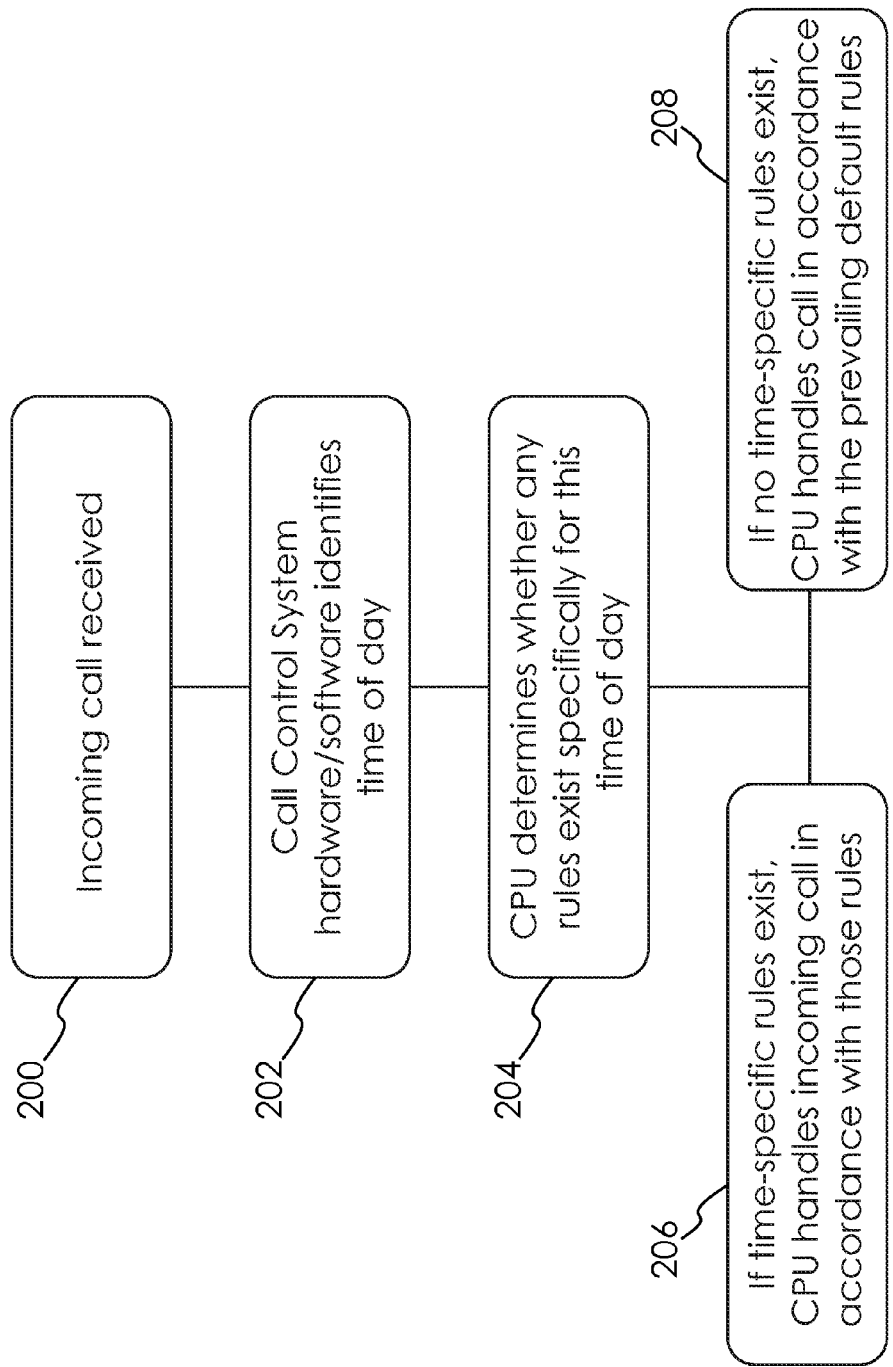
FIG. 3 illustrates another exemplary method for controlling incoming calls for a home or office, according to one embodiment of the present invention.

FIG. 3 shows another process for handling an incoming call. The incoming call is received at step 200, and the call control system hardware/software determines the time of day at step 202. The call control system then determines at step 204 whether any rules exist for that time of day. If so, the call control system applies the rules at step 206 and routes or otherwise handles the call accordingly. If there are no rules for that time of day, the call is processed at step 208 according to a user-determined set of "default" rules.

Figure 4:
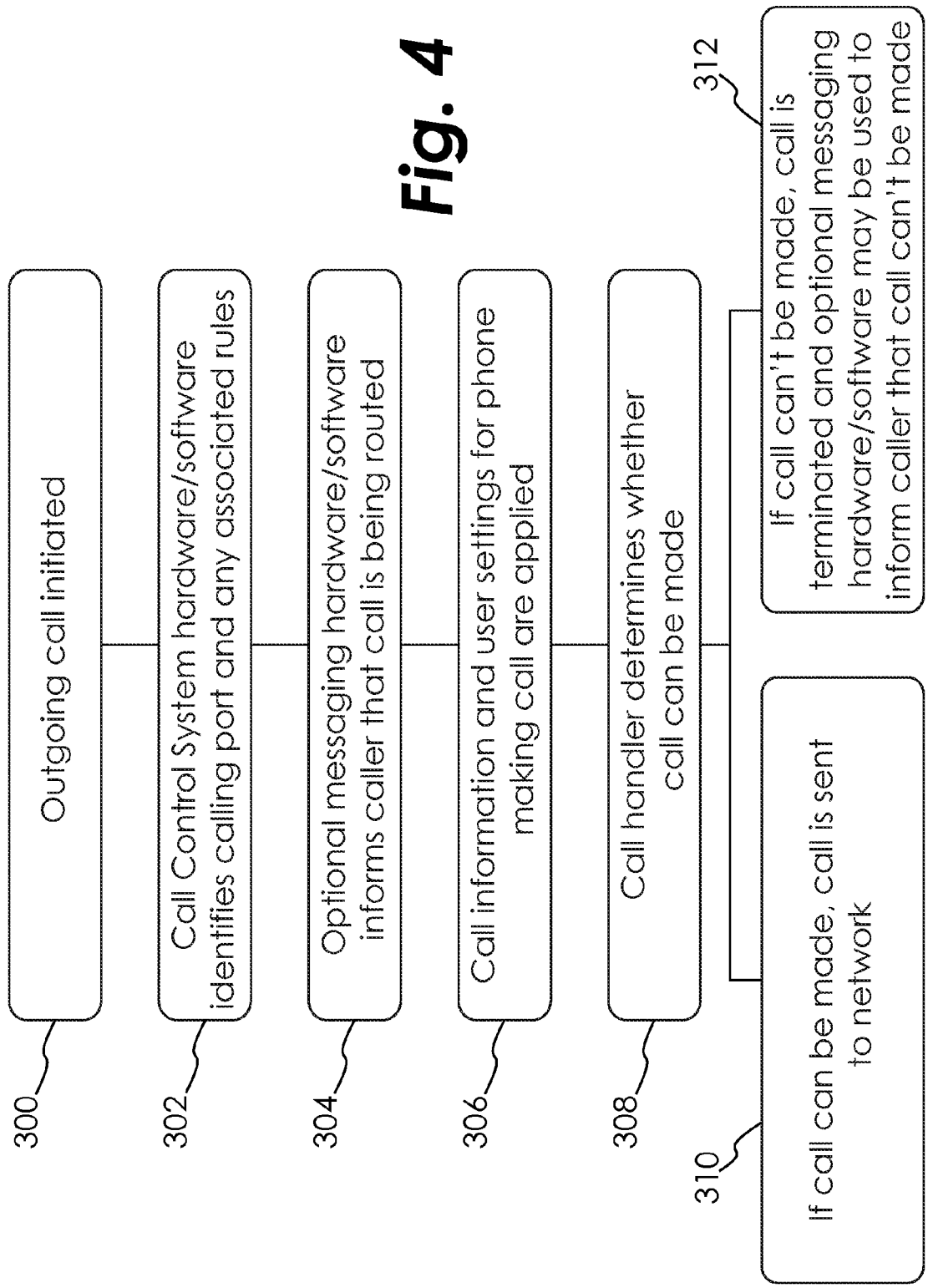
FIG. 4 illustrates an exemplary method for controlling outgoing calls for a home or office, according to one embodiment of the present invention.

FIG. 4 shows a process for handling an outgoing call. An outgoing call is initiated at step 300 on a telephone unit 16 connected to one of the telephone ports 14, and the call control hardware/software determines at step 302 which port 14 is initiating the call and whether there are rules that apply to that telephone port 14. Optional messaging hardware/software may be used at step 304 to inform the caller that the call is being routed. Call information and user settings for the port 14 attempting to place the call are applied at step 306, and the call handler determines at step 308 whether the call can be made. If the call can be made, the call is sent to the network at step 310. If the rules dictate that the call cannot be made, the call is terminated and optional messaging hardware/software informs the caller at step 312 that the call cannot be placed.

It is to be appreciated that the inventive system and method allows the home telephone system user to enforce call handling rules without calling the phone or cable company for changes. This facilitates efficient service, making the system easier to use and less costly.

It is also to be appreciated that the inventive system and method provide a hardware interface that is less expensive than conventional, network based systems.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A call control system for controlling calls to or from a telephone user, the system comprising:
   a central processing unit having an input and an output;
   a home telephone network, comprising:
      an incoming/outgoing telephone line operatively coupled to the central processing unit input;
      a plurality of telephone ports operatively coupled to the central processing unit output;
      a database coupled to said central processing unit for exchange of data, said database storing instructions for processing calls to or from said telephone line;
   wherein said central processing unit:
      executes one or more of said instructions to selectively process an incoming or outgoing telephone call;
      identifies that previous outgoing calls to a particular number were placed from a particular port; and
      writes, in the database, an instruction to route to that particular port future incoming calls from that particular number, based on an identification of the particular port as placing the previous outgoing calls.

2. The system of claim 1, wherein said database includes instructions for routing an incoming call to one or more of said plurality of telephone ports.

3. The system of claim 1, further comprising a caller identification device for identifying a caller number associated with a telephone call placed to said telephone line.

4. The system of claim 3, wherein said database includes instructions for processing an incoming telephone call according to the identity of the caller number.

5. The system of claim 4, wherein said instructions for processing an incoming telephone call according to the identity of the caller number includes instructions for accepting or not accepting a call according to the identity of the caller number.

6. The system of claim 4, wherein said instructions for processing an incoming telephone call according to the identity of the caller number includes instructions for routing a call from a specific caller number to one or more of said plurality of telephone ports.

7. The system of claim 4, wherein said instructions for processing an incoming telephone call according to the identity of the caller number includes instructions for applying a selected ring tone to the call according to the identity of the caller number.

8. The system of claim 1, wherein said database includes instructions for processing an incoming call according to the time of day.

9. The system of claim 8, wherein said instructions for processing an incoming call according to the time of day includes instructions for routing the call to one or more of said telephone ports according to the time of day.

10. The system of claim 1, wherein said home telephone network is a residential telephone system.

11. The system of claim 1, further comprising a global address book operatively coupled to said central processing unit for exchange of data.

12. The system of claim 1, wherein said database includes instructions for allowing or disallowing a call to be made from one or more of said plurality of telephone ports.

13. The system of claim 1, wherein said database includes instructions for allowing or disallowing a call to be made to a specified number.

14. The system of claim 1, wherein said database includes instructions for allowing or disallowing toll calls to be made from one or more of said plurality of telephone ports.

15. A method for controlling incoming telephone calls, comprising the steps of:
   a) receiving a telephone call to a single telephone line operatively coupled to a central processing unit to which a plurality of telephone ports are operatively connected;
   b) accessing a database of instructions for processing a call to said telephone line according to one or more user-specified parameters; and
   c) executing, with the central processing unit, one or more of said instructions from the database of instructions to process the telephone call, wherein said one or more instructions are selected based upon one or more attributes of the telephone call;
   d) identifying, with a central processing unit, that previous outgoing calls to a particular number were placed from a particular port; and
   e) writing, in the database, an instruction to route to that particular port future incoming calls from that particular number, based on an identification of the particular port as placing the previous outgoing calls.

16. The method of claim 15, wherein step (c) comprises routing the telephone call to one or more of said plurality of telephone ports.

17. The method of claim 15, wherein said one or more attributes includes a caller identification associated with said telephone call.

18. The method of claim 17, wherein step (c) comprises processing an incoming telephone call according to the caller identification.

19. The method of claim 18, wherein said processing of step (c) includes accepting or not accepting said telephone call according to the caller identification.

20. The method of claim 18, wherein said processing of step (c) includes routing said telephone call to one or more of said plurality of phone ports according to the caller identification.

21. The method of claim 18, wherein said processing of step (c) includes applying a selected ring tone to said telephone call according to the caller identification.

22. The method of claim 15, wherein said processing of step (c) includes processing the telephone call according to a time of day.

23. The method of claim 22, wherein said processing of step (c) includes routing said telephone call to one or more of said plurality of telephone ports according to the time of day.

* * * * *